United States Patent

Tertilt et al.

[11] Patent Number: 5,787,694
[45] Date of Patent: Aug. 4, 1998

[54] PISTON OPERATED COLLECTING MACHINE FOR AGRICULTURAL HARVESTED PRODUCTS

[75] Inventors: Werner Tertilt, Marienfeld; Martin Hawlas, Harsewinkel, both of Germany

[73] Assignee: Claas Kommanditgesellschaft auf Aktien, Harsewinkel, Germany

[21] Appl. No.: 617,286

[22] Filed: Mar. 18, 1996

[30] Foreign Application Priority Data

Mar. 16, 1995 [DE] Germany ............ 295 04 531 U
Feb. 1, 1996 [DE] Germany ............ 296 01 671 U

[51] Int. Cl.⁶ .................................................. A01D 87/00
[52] U.S. Cl. .................................................. 56/14.5; 56/344
[58] Field of Search ............................ 56/10.3, 14.5, 56/14.6, DIG. 6, DIG. 15, 432, 434, 436; 192/47.2, 48.3, 48.7, 56.1; 100/187, 188, 189, 192

[56] References Cited

U.S. PATENT DOCUMENTS

| | | | |
|---|---|---|---|
| 3,958,397 | 5/1976 | Stiff | 56/10.3 |
| 4,164,995 | 8/1979 | McFarland | 56/10.3 X |
| 4,185,446 | 1/1980 | Clostenmeyer et al. | 56/344 |
| 4,306,403 | 12/1981 | Hubbard et al. | 56/28 X |
| 4,825,760 | 5/1989 | Weddeling | 56/344 X |
| 4,866,918 | 9/1989 | Engelstad et al. | 56/10.3 |
| 5,056,302 | 10/1991 | Rosenbalm et al. | 56/10.3 |
| 5,535,830 | 7/1996 | Matsushita et al. | 172/7 |

*Primary Examiner*—Terry Lee Melius
*Assistant Examiner*—Robert Pezzuto
*Attorney, Agent, or Firm*—Michael J. Striker

[57] ABSTRACT

A piston operated collecting machine for an agricultural harvested product comprises a pressing piston, a collector for collecting a harvested product, a feeding element for supplying the harvested product to the collector, a transmission having an input shaft connectable with a drive shaft of a pulling vehicle and imparting a movement to the pressing piston, two driven shafts operating so that one of the driven shaft drives the collector while another of the driven shafts drives the feeding element, and two overloading couplings arranged so that one of the driven shafts is connected with the transmission through one of the overloading couplings, while another of the driven shafts is connected with the transmission through another of the overloading couplings.

13 Claims, 1 Drawing Sheet

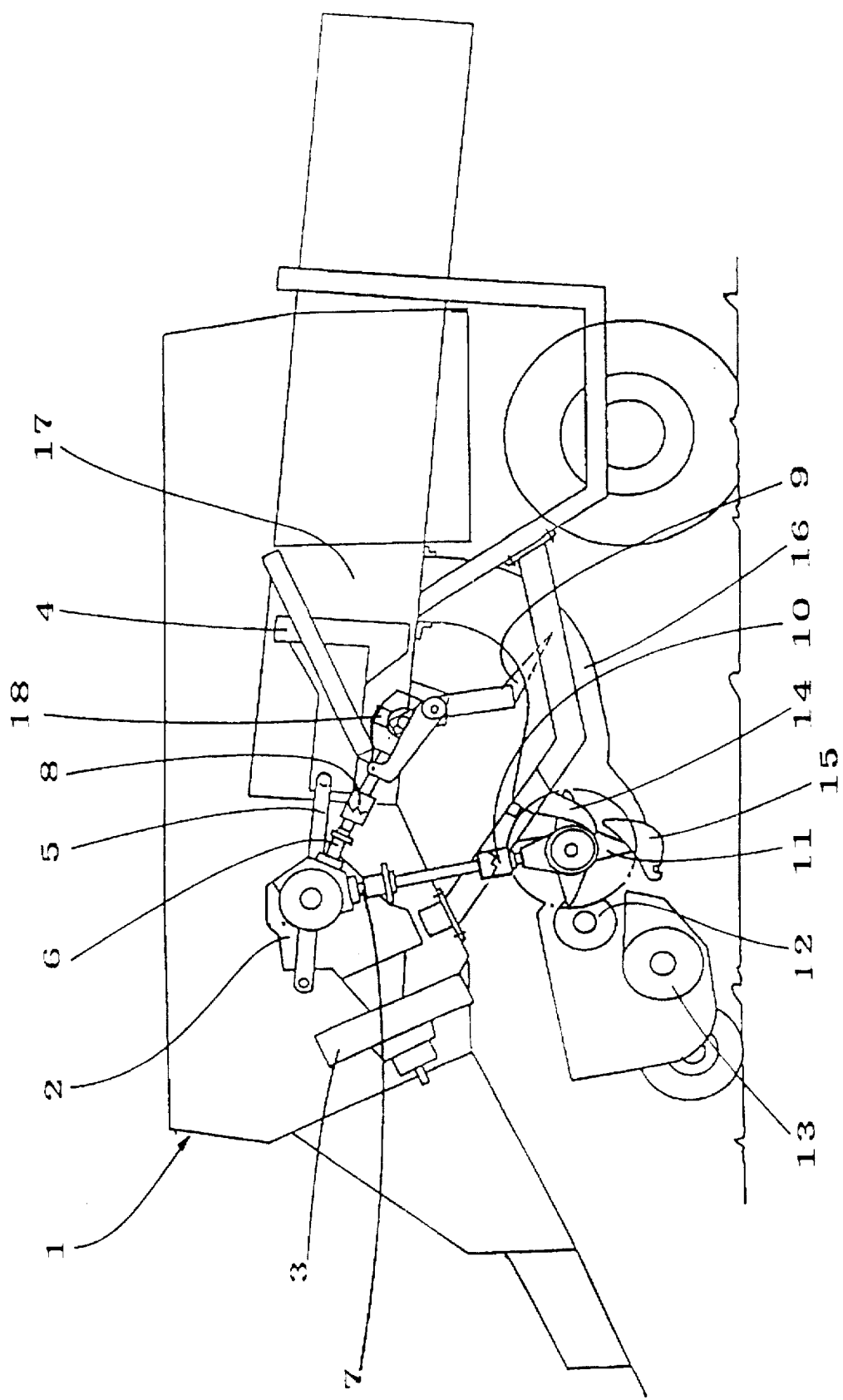

PISTON OPERATED COLLECTING MACHINE FOR AGRICULTURAL HARVESTED PRODUCTS

BACKGROUND OF THE INVENTION

The present invention relates to a piston operated collecting for agricultural harvested products.

More particularly, it relates to such a piston operated collecting machine which has a transmission with an input shaft connectable through a flywheel mass with a drive shaft of a pulling vehicle, with a crank drive for driving the pressing piston, with two driven shafts operating so that one of the driven shafts drives a collector and the other of the driven shafts drives a feeding member which supplies the harvested products to the collector.

It is known to utilize piston collecting machines which are provided with measures for avoiding overloading. For this purpose, a sliding coupling is provided in the drive train from the pulling vehicle to the flywheel mass. The coupling however does not operate first of all for the overloading protection of the machine, but more as the protection of the drive of the pulling vehicle from the action of the flywheel mass. The overloading protection of the machine itself is provided by a coupling which is arranged between the flywheel mass and the drive of the piston collecting machine. Such a coupling can be formed for example as a shearing pin coupling. The coupling interrupts the drive train from the flywheel mass to the transmission when the whole machine is overloaded. It has been shown in practice that such an overloading safety system for a piston collecting machine has the disadvantage that it is not sufficient to efficiently protect individual members against overstressing.

SUMMARY OF THE INVENTION

Accordingly, it is an object of the present invention to provide a piston collecting machine, which avoids the disadvantages of the prior art.

More particularly, it is an object of the present invention to provide a piston collecting machine of the above mentioned type in which the usual operational elements which are connected with the transmission are efficiently protected from overloading on the one hand, and also measures are provided to guarantee that the subsequent operation of the individual elements after the operational interruption is performed without overloading.

In keeping with these objects and with others which will become apparent hereinafter, one feature of the present invention resides, briefly stated, in a piston collecting machine with two driven shafts extending from a transmission housing, in which in accordance with the present invention both driven shafts are connected with the transmission with interposition of an overloading coupling between each of the driven shafts and the transmission.

When the piston collecting machine is designed in accordance with the present invention, it avoids the disadvantages of the prior art and provides for the highly advantageous results specified hereinabove.

Preferably, in accordance with another feature of the present invention, the overloading coupling associated with the driven shaft for the collector is a wedge switch coupling which, at a predetermined torque, is turned off and then again turned on after lowering of the rotary speed of the driven shaft to a predetermined value again.

In accordance with a further important feature of the present invention, the overloading coupling associated with the driven shaft for the feeding element in addition to its normal protective functions for the feeding element also turns off when the overloading coupling for the collector is turned off. It is then turned on when the collector coupling is turned on, and the collector reaches its rotary speed required for the orderly operation.

In accordance with another advantageous feature of the present invention, a rotary speed controller is associated with the collector, and activated during turning off of the wedge switch coupling. During lowering of the operational rotary speed of the coupling for the feeding element it is turned off and again turned on when the collector after lowering its rotary speed reaches again its operational rotary speed.

In accordance with still another feature of the present invention, the coupling for the feeding element can be an electromagnetic coupling. In some cases however it is advantageous when the coupling is formed as a hydraulically switchable coupling. It is to be understood that also mechanical switchable couplings can be utilized as well.

In accordance with an alternative embodiment of the present invention, the inventive piston collecting machine in which the shaft extending from the transmission housing for driving the collector and for driving of the prearranged feeding element is associated with an overloading coupling, can be formed so that a rotary speed and/or a torque controller is associated with the collector so that in the event exceeding a preadjusted value the drive of the feeding element is turned off. In the piston collecting machine designed in accordance with the present invention the drive for the feeding element in the event of the overloading of the collector is turned off. Therefore the collector can be unloaded from the product clogged in it without further supply. If however the product is clogged so strongly that even in the event when the product is no longer supplied by the feeding element the collector cannot freely operate, it is advantageous when the overloading coupling associated with the collector shaft interrupts the drive to the collector when the rotary speed and/or the torque controller turns off the drive for the feeding element and the adjusted limiting value is further exceeded. In this manner damages to the collector are efficiently avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing a piston collecting machine for an agricultural harvested product in accordance with the present invention.

DESCRIPTION OF THE PREFERRED EMBODIMENTS

The piston collecting press or machine for agricultural harvested product is identified as a total with reference numeral 1. It has a transmission 2 which is connected through an input shaft with a flywheel gear 3, in some cases with interposition of an overloading coupling. The flywheel gear 3 is driven in a known manner from a not shown pulling vehicle for the machine 1.

The machine further has a piston 4 which is driven by the transmission 2 cyclically through a crank drive 5 in a reciprocating motion. In addition to the crank drive 5, the transmission has two driven shafts 6 and 7. The driven shaft 6 operates for driving a collector 9 with interposition of a wedge switch coupling 8. The driven shaft 7 operates for driving a cutting rotor 11 with interposition of an electromagnetic coupling 10. A collecting screw 12 and a pick up 13 are connected with the cutting rotor 11 drivingly. A stripper 14 and a countercutter 15 are associated with the cutting rotor 11 in a known manner. The countercutter 15 is disengageable from the cutting rotor 11 in a known manner. the countercutter 15 is disengageable from the cutting rotor 11 when needed.

During the operation a harvested product is transported by the supply elements 11, 12, 13 into a passage 16. The product located in the passage 16 is cyclically transported into a pressing passage 17 by a collector 9, and the product is compressed in the pressing passage 16 by the piston 4. The movements of the piston 4 and the collector 9 are determined relative to one another so that always the harvested product is supplied into the pressing passage 17 when the piston 4 assumes its withdrawn position shown in the drawings and the opening from the passage 16 to the pressing passage 17 is released.

If the product is clogged or piled up in the passage 16, the torque for driving the collector 9 increases. When the torque exceeds a predetermined value, the wedge switch coupling 8 is turned off. In this moment the rotary speed of the collector 9 is reduced. A rotary controller 18 associated with the collector 9 produces a signal to the electromagnetic coupling 10, so that it interrupts the driving connection from the transmission 2 to the coupling rotor 11. The wedge switch coupling 8 is formed in a known manner, so that upon exceeding of a predetermined lower rotary speed of the driven shaft 6 of for example 100 revolution per minute it is again turned on. This means that the collector at this rotary speed is again set in operation. The magnetic coupling 10 remains in this starting condition of the collector however open until the collector 9 assumes its operational rotary speed of for example 140 revolutions per minute. In this moment a signal is transmitted via the rotary speed controller 18, which operates as a control signal for turning on of the electromagnetic coupling 10. After an operational interruption, the supply elements 11–13 are turned on again when the collector 9 empties the passage 16. This means on the one hand that the collector first removes the product located in the passage 16 without supplying a further product. On the other hand, this means that the supply elements 11–13 can run without high power consumption since at their output end no product jam is available any longer.

In the above described embodiment, the rotary of the collector also reduces to 100 revolutions per minute before the wedge switch coupling 8 is again turned on. Alternatively, the machine can be designed so that in the event of insignificant lowering of the rotary number of the collectors due to its overloading, the wedge switch coupling 8 is first not turned on but instead only the electromagnetic coupling 10 is turned on and is controlled via the rotary speed controller 18 which can be also a torque controller. The collector 9 can also have the possibility to discharge the product jam located before it without a further supply of the product. This occurs in approximately all cases, so that after obtaining the operational rotary speed of the collector, the rotary speed controller produces a signal for the electromagnetic coupling and the electromagnetic coupling is turned on. Thereby a continuous operation is guaranteed. When, however, the jam is so dense that the rotary speed of the collector is further lowered and/or the torque to be transmitted further increases, the wedge switch coupling 8 interrupts the drive of the collector 9.

It will be understood that each of the elements described above, or two or more together, may also find a useful application in other types of constructions differing from the types described above.

While the invention has been illustrated and described as embodied in a piston collecting machine for agricultural harvested product, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A piston operated collecting machine for an agricultural harvested product, comprising a pressing piston; a collector for collecting a harvested product; a feeding element for supplying the harvested product to said collector; a transmission having an input shaft connectable with a drive shaft of a pulling vehicle and imparting a movement to said pressing piston; two driven shafts operating so that one of said driven shafts drives said collector while another of said driven shafts drives said feeding element; and overload protection means provided for protection of a drive train of said collector and said feeding element from overloading and including two overloading couplings arranged so that one of said driven shafts is connected with said transmission through one of said overloading couplings, while another of said driven shafts is connected with said transmission through another of said overloading couplings, so that when said feeding element is overloaded and the driven shaft of said feeding element is disconnected from the transmission, said collector can still run to prevent clogging, thereby clearing up said feeding element.

2. A piston operated collecting machine as defined in claim 1, wherein said another overloading coupling for said feeding element is formed as an electromagnetic coupling.

3. A piston operated collecting machine as defined in claim 1, wherein said another overloading coupling for said feeding element is formed as a hydraulically switchable coupling.

4. A piston operated collecting machine as defined in claim 1, wherein said another overloading coupling for said feeding element is formed as a mechanically switchable coupling.

5. A piston operated collecting machine for an agricultural harvested product, comprising a pressing piston; a collector for collecting a harvested product; a feeding element for supplying the harvested product to said collector; a transmission having an input shaft connectable with a drive shaft of a pulling vehicle and imparting a movement to said pressing piston; two driven shafts operating so that one of said driven shafts drives said collector while another of said driven shafts drives said feeding element; two overloading couplings arranged so that one of said driven shafts is connected with said transmission through one of said overloading couplings, while another of said driven shafts is connected with said transmission through another of said overloading couplings, said one overloading coupling being associated with said driven shaft for said collector and formed as a wedge switch coupling which is turned off at a predetermined torque and again turned on after lowering of a rotary speed of said driven shaft for said collector to a predetermined value.

6. A piston operated collecting machine as defined in claim 5, wherein said another overloading coupling is associated with said driven shaft for said feeding element and formed so that in addition to a switching function for said feeding element said another overloading coupling is turned off when said one overloading coupling for said collector is turned off, and is again turned on when said one overloading coupling for said collector is turned on and said collector assumes a rotary speed for a normal operation.

7. A piston operated collecting machine for an agricultural harvested product, comprising a pressing piston; a collector for collecting a harvested product; a feeding element for supplying the harvested product to said collector; a transmission having an input shaft connectable with a drive shaft of a pulling vehicle and imparting a movement to said pressing piston; two driven shafts operating so that one of said driven shafts drives said collector while another of said driven shafts drives said feeding element; two overloading couplings arranged so that one of said driven shafts is connected with said transmission through one of said overloading couplings, while another of said driven shafts is connected with said transmission through another of said overloading couplings, said one overloading coupling being associated with said driven shaft for said collector, while said another overloading coupling being associated with said driven shaft for said feeding element; and a rotary speed controller associated with said collector and activated when said one overloading coupling for said collector is turned off, said rotary speed controller in the event of lowering of a rotary speed turns off said another overloading coupling for said feeding element and again turns on said another overloading coupling for said feeding element when said collector after lowering of a rotary speed of said collector again reaches an operational rotary speed.

8. A piston operated collecting machine for an agricultural harvested product, comprising a pressing piston; a collector for collecting a harvested product; a feeding element for supplying the harvested product to said collector; a transmission having an input shaft connectable with a drive shaft of a pulling vehicle and imparting a movement to said pressing piston; two driven shafts operating so that one of said driven shafts drives said collector while another of said driven shafts drives said feeding element; two overloading couplings arranged so that one of said driven shafts is connected with said transmission through one of said overloading couplings, while another of said driven shafts is connected with said transmission through another of said overloading couplings; and a controller associated with said driven shaft which drives said collector, said controller being formed so that in the event of exceeding of a predetermined value said controller turns off a drive of said feeding element.

9. A piston operated collecting machine as defined in claim 8, wherein said controller is a rotary speed controller.

10. A piston operated collecting machine as defined in claim 8, wherein said controller is a torque controller.

11. A piston operated collecting machine for an agricultural harvested product, comprising a pressing piston; a collector for collecting a harvested product; a feeding element for supplying the harvested product to said collector; a transmission having an input shaft connectable with a drive shaft of a pulling vehicle and imparting a movement to said pressing piston; two driven shafts operating so that one of said driven shafts drives said collector while another of said driven shafts drives said feeding element; two overloading couplings arranged so that one of said driven shafts is connected with said transmission through one of said overloading couplings, while another of said driven shafts is connected with said transmission through another of said overloading couplings, said one overloading coupling being associated with said driven shaft for said collector; and a controller, said one overloading coupling for said driven shaft of said collector being formed so that said one overloading coupling is first interrupted when said controller turns off a drive for said feeding element and an adjusted limiting value is exceeded.

12. A piston operated collecting machine as defined in claim 11, wherein said controller is a rotary speed controller.

13. A piston operated collecting machine as defined in claim 11, wherein said controller is a torque controller.

* * * * *